(12) United States Patent
Bauer et al.

(10) Patent No.: US 8,931,612 B2
(45) Date of Patent: Jan. 13, 2015

(54) DEVICE FOR OPERATING A PARKING LOCK

(75) Inventors: Martin Bauer, Ingolstadt (DE); Wilhelmus Gieles, Wettstetten (DE)

(73) Assignee: Audi AG, Ingolstadt (DE)

( * ) Notice: Subject to any disclaimer, the term of this patent is extended or adjusted under 35 U.S.C. 154(b) by 346 days.

(21) Appl. No.: 13/333,077

(22) Filed: Dec. 21, 2011

(65) Prior Publication Data

US 2012/0160631 A1 Jun. 28, 2012

(30) Foreign Application Priority Data

Dec. 22, 2010 (DE) .......................... 10 2010 055 859

(51) Int. Cl.
- *B60W 10/18* (2012.01)
- *F16H 63/34* (2006.01)
- *F16H 63/48* (2006.01)

(52) U.S. Cl.
CPC ............ *F16H 63/3483* (2013.01); *F16H 63/48* (2013.01)
USPC ...................................................... 192/219.5

(58) Field of Classification Search
None
See application file for complete search history.

(56) References Cited

U.S. PATENT DOCUMENTS

| | | | |
|---|---|---|---|
| 6,581,738 B2 * | 6/2003 | Schafer et al. ............... | 192/13 R |
| 2007/0191182 A1 | 8/2007 | Kiski et al. | |
| 2008/0039282 A1 | 2/2008 | Yoshiyama et al. | |
| 2011/0198190 A1 * | 8/2011 | Steinhauser et al. ....... | 192/219.5 |

FOREIGN PATENT DOCUMENTS

| | | |
|---|---|---|
| CN | 101021284 | 8/2007 |
| CN | 101122336 | 2/2008 |
| DE | 196 25 019 A1 | 1/1998 |
| DE | 198 34 156 A1 | 2/2000 |
| DE | 100 14 465 A1 | 10/2001 |
| DE | 10 2004 043 344 A1 | 4/2006 |
| DE | 10 2007 020 346 A1 | 11/2008 |
| DE | 10 2008 000 119 A1 | 7/2009 |
| WO | WO 2005/124198 A1 | 12/2005 |

\* cited by examiner

*Primary Examiner* — Robert A Siconolfi
*Assistant Examiner* — Huan Le
(74) *Attorney, Agent, or Firm* — Henry M. Feiereisen LLC

(57) ABSTRACT

The invention relates to a device for operating a parking lock of an automatic transmission in motor vehicles, with pawl which interacts with a ratchet wheel, which pawl is impinged upon by a spring energy accumulator (24) and for disengaging the parking lock can be hydraulically impinged upon against the preload force of the spring energy accumulator (24) by a hydraulic transmission control with corresponding control valves, wherein the control valves are controllable in accordance with operating parameters of the motor vehicle and a electromagnetically operable locking element (28), which in the controlled state in defined operating conditions additionally holds the pawl in the disengaged position. According to the invention, a purely hydraulically acting self locking valve (40) is integrated in the hydraulic transmission control (10), which locking valve maintains the controlled system pressure when the parking lock operation (14) is pressurized or when the parking lock is disengaged.

9 Claims, 3 Drawing Sheets

Fig. 3

| | State vehicle / State motor / Status parking lock | Vehicle stationary Engine off PS engaged | Vehicle stationary Engine on hold PS engaged | Vehicle stationary Engine on Disengage PS | Vehicle drives Engine on hold | Vehicle stationary Engine on Engage PS | Vehicle rolls Engine off keep PS disengaged | Vehicle stationary Engine off engage |
|---|---|---|---|---|---|---|---|---|
| Valve | State valve | | | | | | | |
| PAV (38) Configuration 3/2-switching valve Electrically actuated, NH | Current: I = 0 Through flow: P -> A | X | | | | X | | X |
| | Current: I = max Through flow: A -> I (parking lock can be disengaged) | | X | 2. | X | | X | |
| PEV (42) Configuration 3/2-switching valve electric | Current: I = 0 Through flow: P -> A | X | | 1. | X | | X | |
| | Current: I = max Through flow: A -> T (parking lock is engaged) | | X – (Redundancy) | | | 1. | | 1. |
| SHV (40) Configuration: 3/2-switching valve Not electrically actuated | Current: A -> T (disengagement pressure not available) | X | X | | X | 2. | X | 2. |
| | Through flow: P -> A (disengagement pressure available) | | | 3. | | | | |
| PHM (28) Holding magnet, currentless open | Current: I=0 (does not hold parking lock open) | X | X | | | 3. | | 3. |
| | Current: I=200mA (holds parking lock open) | | | 4. | X | | X | |

DEVICE FOR OPERATING A PARKING LOCK

CROSS-REFERENCES TO RELATED APPLICATIONS

This application claims the priority of German Patent Application, Serial No. 10 2010 055 859.1, filed Dec. 22, 2010, pursuant to 35 U.S.C. 119(a)-(d).

BACKGROUND OF THE INVENTION

The invention relates to a device for operating a parking lock of an automatic transmission in motor vehicles.

With the refinement of automatic transmissions in motor vehicles, transmission controls are already known, which also include the parking lock in the shift by wire system, such that it can no longer be operated mechanically, for example via a selector of the transmission control, with the possible exception of an emergency release. Understandably, such an automated control of the parking lock has to be secured such that in the case of errors in the control (for example electrical conductor interruption, short circuits, pressure loss in the hydraulic system) an unintended disengagement of the parking lock when the vehicle is stationary, or engagement of the parking lock during driving of the motor vehicle is excluded as far as possible.

Further, DE 196 25 019 A1 discloses, beside the hydraulic control of the operation of the parking lock, an electromagnetic locking element, which holds the pawl of the parking lock in the disengaged position for the hydraulic application, which in the case of a system failure in the hydraulic transmission control (for example by engine failure) prevents the parking lock from being unintentionally engaged. Further, a logical connection in an electronic transmission control device ensures, that the parking lock is automatically engaged or disengaged only in accordance with a selection device and/or defined operating parameters of the motor vehicle (for example ignition key position, vehicle speed, state of the parking brake, engine speed, etc.) by controlling corresponding control valves (not shown in DE) and locking elements. An advantageous locking element with low electricity consumption is disclosed, for example, in DE 198 34 156 A1.

SUMMARY OF THE INVENTION

The object of the invention is to provide a device of the generic type, in which the hydraulic control of the parking lock comprises valve means and is particularly fail safe.

This object is solved according to the invention with the features set forth in patent claim 1. Advantageous and particularly useful refinements of the invention are set forth in the additional patent claims.

According to the invention, it is proposed, that a self locking valve, which acts exclusively hydraulically, is integrated into the hydraulic transmission control, and which maintains the system pressure when the parking lock mechanism is pressure loaded or when the parking lock is disengaged. The self locking valve causes a stabilization of the pressure load on the parking lock in the disengaged state, such that for example in the case of an interruption in the electronic control or other malfunction, an unintended engagement of the parking lock is avoided.

Particularly preferably, the self locking valve in the pressure line of the parking lock mechanism can be configured bi-stable and, in the deactivated starting position be pressurized via the control line of the pressure control valve and in the active valve position, be pressurized via the pressure line. This ensures a relatively robust and reliable configuration, in which the self locking valve is activated by pressure control via the pressure control valve or the pressure line of the parking lock mechanism.

An advantageously easy deactivation of the self locking valve is further achieved by an additional control line of a reset valve which is integrated in the pressure line for the parking lock mechanism downstream of the self locking valve, and is connected to the self locking valve and depressurizes the self locking valve on one side for switching to the starting position.

It is further proposed to integrate a throttle valve in the pressure line for the parking lock mechanism upstream of the self locking valve, which avoids that the self locking valve is switched to the self locking valve position in the case of pressure build up in the hydraulic transmission control, in the case of a preceding engine failure. This could be caused by different line resistances or line lengths between the control line of the pressure valve on the one hand, and the pressure line to the self locking valve on the other hand, wherein the throttle valve however, advantageously delays the pressure build up in the pressure line relative to the control line of the pressure control valve.

The bi-stable function of the self locking valve advantageously allows the pressure control valve for disengaging the parking lock, which can be operated electromagnetically, to be controlled only briefly until the self locking valve responses. This lowers electricity consumption in the transmission control and at the same time a more robust, more wear resistant valve control.

The same applies to the electromagnetically operable reset valve for engaging the parking lock, which is also only briefly supplied with current until the self locking valve is deactivated, or, in the starting position, connects the parallel pressure line to the return flow of the hydraulic transmission control.

In an advantageous refinement of the invention, the pressure control valve and the self locking valve can be connected to the system-main pressure line. Further, the self locking valve and the reset valve are arranged in series in the pressure line leading to the parking lock mechanism, wherein, in their deactivated, spring loaded starting position, the pressure control valve is connected to the main pressure line, the self locking valve to the return flow and the reset valve to the pressure line, and wherein further, the self locking valve with its switching surface, which causes the self locking or the starting position, is connected to the pressure line downstream of the reset valve via a control line of the pressure control valve or via a further control line.

In particular, for convenient manufacturing, the pressure control valve, the self locking valve and the reset valve can be configured as 3/2 way valves.

Finally, the pressure control valve, the reset valve and the locking element can be controlled via an electronic transmission control unit in accordance with a selection device and additional operational parameters of the motor vehicle such as driving speed, engine speed, operation state switch (ignition key) etc.

BRIEF DESCRIPTION OF THE DRAWING

In the following, an example of an embodiment of the invention is described in more detail. The schematic drawings show in FIG. 1 a hydraulic circuit diagram of the hydraulic transmission control of the parking lock of an automatic transmission in a motor vehicle, with a pressure control valve, a self locking valve and a reset valve, as well as an electromagnetic locking element for the parking lock;

FIG. 3 an exemplary table for to show the control of the pressure control valve, the reset valve and the locking element in dependence of defined operation state of the motor vehicle.

DETAILED DESCRIPTION OF PREFERRED EMBODIMENTS

Figure 1:
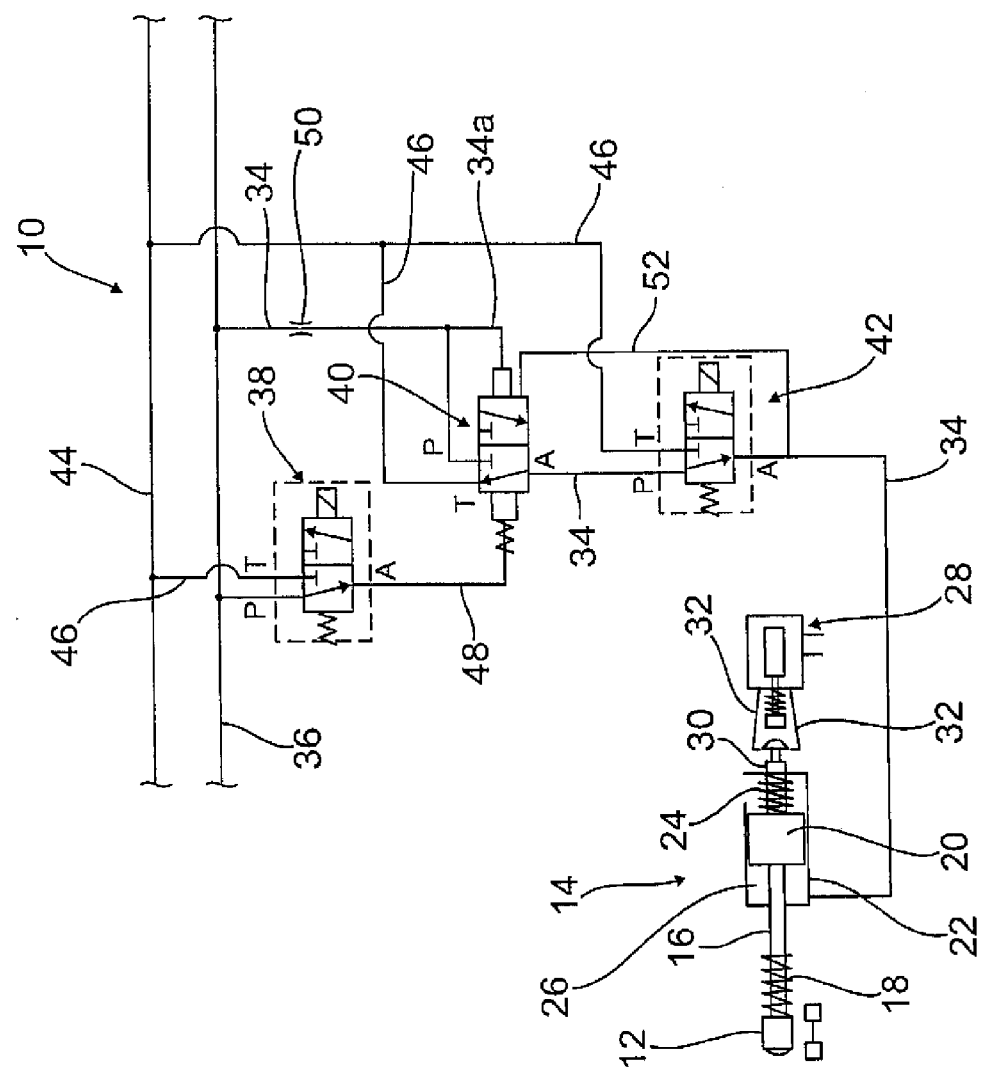

In FIG. 1, 10 designates the section of interest, with regard the present invention, of an electro-hydraulic transmission control for engagement or disengagement of a parking lock of an automatic transmission in a motor vehicle.

The parking lock, which is not shown, can have a conventional configuration, with a ratchet wheel which is arranged in the transmission output, and which interacts with a pawl, which is spring loaded and pivotably supported in the transmission housing, and which can be converted from a disengaged (unlocked) position to an engaged (locked) position via a locking slide 12 of the parking lock mechanism 14. The locking slide 12 is slidable on a lever 16 and preloaded by a spring 18 in a known manner, to still enable the predetermined travel of the lever 16 in a tooth on tooth position between the ratchet wheel and the pawl.

The lever 16 is connected firmly to a piston 20, which is slidably guided in a cylinder 22, which is fixed relative to the housing, and which is always spring preloaded towards the left with regard to the drawing, by means of a threaded compression spring as a spring energy accumulator 24. Through the spring energy accumulator 24 the parking lock is shifted into the engaged position with the locking slide 12, by corresponding shifting of the lever 16.

To disengage the parking lock, the hydraulic chamber 26 of the piston-cylinder unit 20, 22 on the left side of the piston 20, is pressurized with hydraulic pressure from the transmission control 10, wherein the lever 16 is displaced by the locking slide 12 towards the right with regard to the drawing, and thus releases the pawl of the parking lock, such that the pawl retracts from the ratchet wheel.

In its disengaged position, the parking lock mechanism 14 can be held via an electromagnetic locking element 28. The locking element 28—which can correspond to the state of the art mentioned in the beginning and is therefore not further described here—engages in a positive locking manner with a locking pin 30 which is arranged on the piston 20, such that when the locking element 28 is supplied with current, arresting hooks 32, which are formed on the locking element 28, are operated electromagnetically to engage behind the locking pin 30 in a form fitting manner and hold the piston 20 in the disengaged position of the parking lock with the lever 16, whereas, when the locking element 28 is not supplied with current the arresting hooks 32 release the parking lock mechanism 14 or enable the engagement of the parking lock, respectively.

The hydraulic control of the parking lock mechanism 14 or the pressurization of the hydraulic chamber 26, respectively, is achieved via a pressure line 34, which is connected to a system-main pressure line 36 of the hydraulic transmission control 10, which is not further shown, and which system main pressure line 34 is provided with a defined system pressure via a hydraulic pump which is driven by the engine or the motor of the motor vehicle respectively.

A self locking valve 40 and a reset valve 42 which are configured as 3/2 way valves, are integrated in the pressure line 34 in the direction of flow, wherein the self locking valve 40 is operated exclusively hydraulically, while the reset valve 42 is operated electromagnetically.

Also connected to the system main pressure line 36 is a pressure control valve 38, which is also constructed as 3/2 way valve and is connected to the left piston surface (not shown) of the self locking valve 40 via a first control line 48.

In the starting position of the pressure control valve 38, which is predetermined by the spring preload, the pressure control valve 38 is open to the control line 48 or the main pressure line 36, or is connected to the self locking valve 40 via the control line 48 (valve position P to A), respectively, and thus holds the self locking valve 40 in the starting position by hydraulic pressure load and by spring preload.

When supplied with current, the pressure control valve 38 switches to a position A to T, in which the control line 48 is connected to a non-pressurized return flow line 46 of a system-return flow 44 of the hydraulic transmission control 10.

The reset valve 42 is open in the spring preloaded starting position, or connects the pressure line 34 correspondingly from P to A, respectively. When the reset valve is supplied with current it connects the downstream section of the pressure line 34 to the return of the hydraulic transmission control 10 via a return line 46.

In its spring preloaded and (if system pressure exists) hydraulically preloaded starting position, the self locking valve 40, which is integrated into the pressure line 34, also connects the section of the pressure line 34, which is downstream from the self locking valve 40, to the return flow line 46 (from A to T), whereas, in the self locking position the self locking valve 40 switches the pressure line 34 to open (from P to A).

Further, a throttle element 50 with a defined reduced flow-through cross section is integrated in the pressure line 34, upstream of the self locking valve 40. The throttle element 50 ensures that the bi-stable self locking valve 40 remains in the starting position when the system pressure starts to build up (when the engine starts).

In addition, a branch 34a of the pressure line 34 pressurizes the right piston surface (not shown) of the valve piston in the self locking valve 40 to achieve the hydraulic self locking when the first control line is unpressurized.

The self locking function of the self locking valve 40 is suspended via the reset valve 42, in that a second control line 52, which branches off downstream of the reset valve 42 is connected inside the valve to the branch 34a of the pressure line 34, which carries the hydraulic pressure, or to the right piston surface, respectively, and reduces the hydraulic pressure via the return flow line 46 to the return flow, when the reset valve 42 is supplied with current.

The hydraulic function of the described valves 38, 40, 42 is as follows:

When the parking lock is engaged via the spring energy accumulator 24, and is to be disengaged when starting to operate the motor vehicle (to be described), the pressure control valve 38 is briefly supplied with current when the motor is running (hydraulic pressure in the system 10 is present), and thus switched to the position A to T. This leads to a pressurization on the left side of the self locking valve 40 via the control line 48, so that the self locking valve 40 switches from the starting position A to T to P to A and supplies the downstream section of the pressure line 34 with hydraulic pressure which propagates through the reset valve 42, which is not supplied with current, into the hydraulic chamber 26 of the piston-cylinder unit 20, 22 and, accordingly, disengages the parking lock.

The disengaged position is maintained through the electromagnetic locking element 28, which, at the same time is supplied with current. Further, as redundant safeguard, the hydraulic pressure, which holds the parking lock in the disengaged position, is maintained via the self locking valve 40.

To reengage the parking lock, the current supply to the electromagnetic locking element 28 is interrupted on the one hand, and on the other hand, the reset valve 42 is briefly supplied with current, so that it connects the downstream section of the pressure line 34 and the control line 52 which branches off from the latter, to the return flow line 46 and the system return flow 44 of the hydraulic transmission control, which triggers the self locking of the self locking valve 40. Thus, the self locking valve 40 returns to the staring position and is hydraulically loaded on its left side.

The accompanying decompression of the hydraulic chamber 26 causes the parking lock to reengage because of the spring force of the spring energy accumulator 24.

Figure 2:
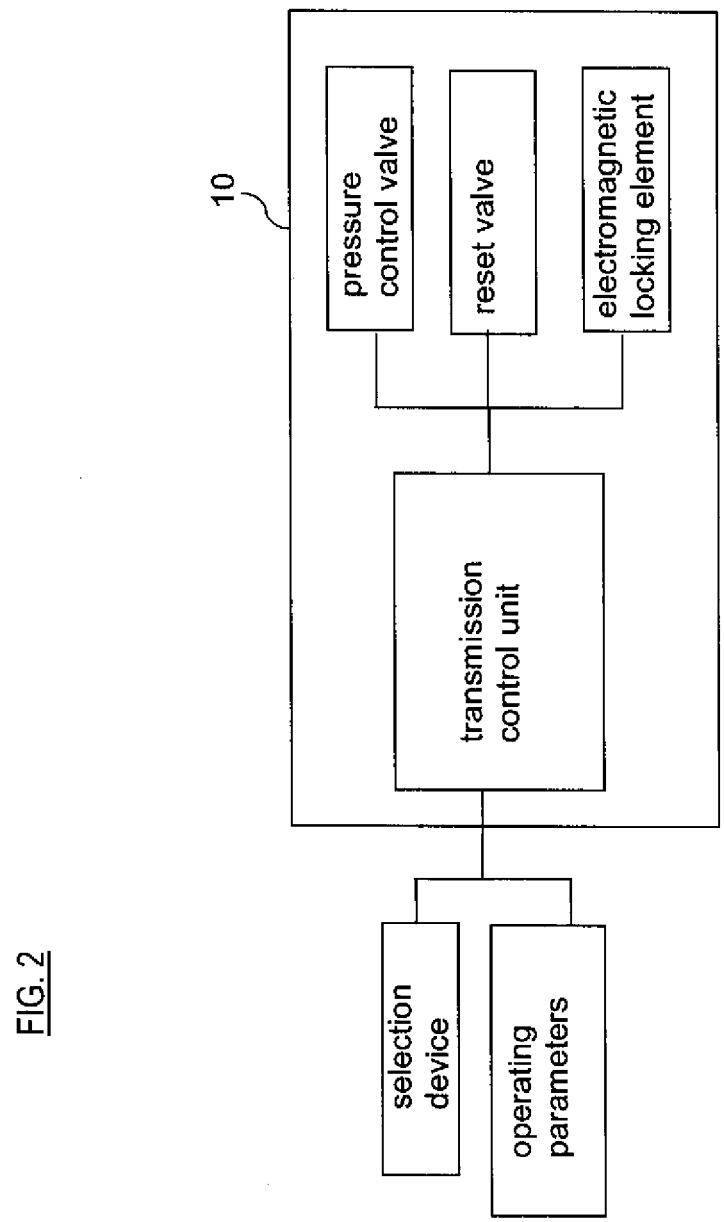
FIG. 2 a simplified circuit diagram of the electric control of the hydraulic valves and the locking element according to FIG. 1.

According to FIG. 2, the described operation of the parking lock is controlled via an electronic control unit 54, which controls the pressure control valve 38, the reset valve 42, and the electromagnetic locking element 28, respectively, in accordance with a selection device—this can be a selector or an electric switch, which is switchable to a position P—and in accordance with additional operating parameters 58 of the motor vehicle as for example, vehicle speed, operating state of the engine, position of the ignition key, etc.

The table according to FIG. 3 shows several operating states of the motor vehicle (vehicle) when the vehicle is stationary or during driving and when the engine is running or is turned off, motor on or off and the status of the valves which is switched and controlled by the control unit, and the electromagnetic locking element 28 with engaged or disengaged parking lock PS respectively. In the diagram of FIG. 3 "x" indicates whether the respective control element 38, 40, 42, 28 is controlled or activated or deactivated, respectively. The drawn numbers (1 to 4 as the case may be) reflect the sequence of the control functions. In the diagram of FIG. 3 the pressure control valve 38 is also referred to as PAV (parking lock disengagement valve), the reset valve is referred to as PEV (parking lock engagement valve), the self locking valve is referred to as SHV and the locking element is referred to as PHM (parking lock holding magnet).

Although the table according to FIG. 3 is self explanatory, some operating states are explained in more detail:

In column 1, the operating state of the vehicle is assumed to be stationary, the engine is turned off and PS (parking lock) is engaged; the position P of the selection device (if present) is not drawn:

According to the table or the drawn "x" respectively, the pressure control valve 38 is not supplied with current (i=0) in the starting position; also not supplied with current is the reset valve 42; as a result, the self locking valve 40 is also in the starting position and finally, the locking element 28 is also not supplied with current or deactivated, respectively.

If, according to column 2, the engine is started, however, PS is intended to remain engaged, the control elements 38, 40, 42, 28 are maintained unchanged; as a safeguard, however, the reset valve 42 can be supplied with current to redundantly ensure that the self locking valve 40 securely remains in its starting position when the system pressure is building up.

In column 3 it is assumed that driving is to be initiated by switching the selection device out of P and/or by engaging a forward or reverse drive gear of the engine; Thus:
1. The reset valve 42 is switched to currentless;
2. The pressure control valve 38 is briefly supplied with current;
3. As a result, the self locking valve 40 changes from its starting position into the self locking position whereby the parking lock mechanism 14 is pressurized and the parking lock is disengaged;

The electromagnetic locking element 28 is supplied with current and accordingly, the parking lock additionally maintained in the disengaged position The described control processes are controlled accordingly via the electronic control unit 54.

The reengagement of the parking lock PS can occur dependent on the vehicle operating parameters 58 and the position of the selection device 56 for example according to column 5 as follows:

When the vehicle is stationary, the motor is still running and the selection device is in P (or if applicable N) position, the pressure control valve 38 is in starting position; Then:
1. the reset valve is supplied with current and connects the pressure line 34 with the unpressurized return flow 46, 44, whereby
2. the self locking valve 40 is depressurized on its right side, causing it to become pressurized on its left side and to switch to the starting position and
3. the current supply to the electromagnetic locking element 28 is turned off.

As a result, the parking lock PS is reengaged via the spring energy accumulator 24 with the hydraulic chamber being unpressurized.

The further possible control functions of the parking lock PS can be seen from the further columns of the table, which however is only exemplary. Further vehicle operating parameters can also be included in the operation logic.

The invention claimed is:

1. Apparatus for operating a parking lock of an automatic transmission in a motor vehicle, comprising:
a spring energy accumulator applying a biasing force upon a pawl to seek engagement in a locking gear of the transmission to thereby engage the parking lock;
a hydraulic transmission control configured for hydraulic actuation of the pawl in opposition to the biasing force of the spring energy accumulator for disengaging the parking lock, said hydraulic transmission control rendered operative as a function of operating parameters of the motor vehicle and in response to an operation of a selection device, said hydraulic transmission control having a hydraulically operated self-locking valve to maintain a system pressure, when the parking lock is disengaged; and
an electromagnetically operated locking element operably connected to the pawl to maintain the pawl in position, when the parking lock is disengaged.

2. The device of claim 1, further comprising a pressure control valve, wherein the self locking valve is constructed bi-stable for assuming an active valve position or a deactivated starting position and is arranged in a pressure line configured for implementing said actuation, and wherein the self locking valve in the deactivated starting position is pressurized via a control line of the electromagnetically operable pressure control valve and in the activated state via the pressure line.

3. The device of claim 2, further comprising a throttle element arranged in the pressure line upstream of the self locking valve.

4. The device of claim 2, wherein the pressure control valve is configured to be electromagnetically operable and is only briefly electrically controlled until the self locking valve responds, for disengaging the parking lock.

5. The device of claim 2, further comprising a reset valve arranged in the control line downstream of the self locking valve, and connected to the self locking valve via a further control line, wherein the reset valve is configured to depressurize the self locking valve for switching the self locking valve to the deactivated starting position.

6. The device of claim 5, wherein the reset valve is configured to be electromagnetically operable and is supplied with a current only briefly until the self locking valve is deactivated or, in the deactivated starting position of the self locking valve, the self locking valve connects the pressure line with a return line of the hydraulic transmission control.

7. The device of claim 6, wherein the pressure control valve and the self locking valve are connected to a system-main pressure line, wherein the self locking valve and the reset valve are arranged in series in the pressure line, wherein in a deactivated starting position of the reset valve and the deactivated starting position of the self locking valve, the pressure control valve is connected to the main pressure line, the self locking valve is connected to the return line and the reset valve is connected to the pressure line, wherein the self locking valve has switching surfaces for implementing the self locking position or the deactivated starting position of the self locking valve, and wherein the switching surfaces are connected to the pressure line via the control line of the pressure control valve or via the further control line.

8. The device according to claim 6, wherein the pressure control valve, the self locking valve, and the reset valve are constructed as 3/2way valves.

9. The device of claim 6, further comprising an electronic transmission control unit for controlling the electromagnetically operable pressure control valve, the electromagnetically operable reset valve, and the locking element as a function of a member selected from the group consisting of the selection device, operating parameters of the motor vehicle, driving speed and ignition key.

* * * * *

UNITED STATES PATENT AND TRADEMARK OFFICE
CERTIFICATE OF CORRECTION

| | | |
|---|---|---|
| PATENT NO. | : 8,931,612 B2 | Page 1 of 1 |
| APPLICATION NO. | : 13/333077 | |
| DATED | : January 13, 2015 | |
| INVENTOR(S) | : Martin Bauer et al. | |

It is certified that error appears in the above-identified patent and that said Letters Patent is hereby corrected as shown below:

On the Title page, column two, Item (56) under FOREIGN PATENT DOCUMENTS, correct "CN 101021284" to read --CN 101021264--.

Signed and Sealed this
First Day of September, 2015

Michelle K. Lee
*Director of the United States Patent and Trademark Office*